US011036085B2

(12) United States Patent
Gordon et al.

(10) Patent No.: US 11,036,085 B2
(45) Date of Patent: Jun. 15, 2021

(54) OPTICALLY-CALIBRATED BACKLIGHT UNIT INTERNAL SUPPORTS

(71) Applicant: Microsoft Technology Licensing, LLC, Redmond, WA (US)

(72) Inventors: Michael Cameron Gordon, Sammamish, WA (US); Peter Richard Oehler, Beaverton, OR (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/360,707

(22) Filed: Mar. 21, 2019

(65) Prior Publication Data

US 2020/0110311 A1  Apr. 9, 2020

Related U.S. Application Data

(60) Provisional application No. 62/742,085, filed on Oct. 5, 2018.

(51) Int. Cl.
*G02F 1/13357* (2006.01)

(52) U.S. Cl.
CPC .. *G02F 1/133608* (2013.01); *G02F 1/133603* (2013.01); *G02F 1/133605* (2013.01)

(58) Field of Classification Search
CPC ......... G02F 1/133602; G02F 1/133603; G02F 1/133605
See application file for complete search history.

(56) References Cited

U.S. PATENT DOCUMENTS

| 6,902,300 | B2 | 6/2005 | Lee |
| 7,220,036 | B2 | 5/2007 | Yi et al. |
| 7,382,423 | B2 | 6/2008 | Chang et al. |
| 8,523,419 | B2 | 9/2013 | Nevitt et al. |
| 8,568,014 | B2 | 10/2013 | Kim |
| 10,041,653 | B2 | 8/2018 | Ahn et al. |
| 2008/0291668 | A1 | 11/2008 | Aylward et al. |
| 2010/0118518 | A1* | 5/2010 | Kuromizu ......... G02F 1/133608 362/97.2 |
| 2014/0376219 | A1* | 12/2014 | Ono ........................ H01L 33/54 362/235 |
| 2017/0009960 | A1* | 1/2017 | Ahn ...................... F21V 7/0066 |
| 2017/0235190 | A1 | 8/2017 | Zhang |

FOREIGN PATENT DOCUMENTS

| EP | 3200017 A2 | 8/2017 |
| EP | 3263972 A1 | 1/2018 |

OTHER PUBLICATIONS

"International Search Report and Written Opinion Issued in PCT Application No. PCT/US19/052325", dated Dec. 11, 2019, 19 Pages.

* cited by examiner

*Primary Examiner* — Thanh Nhan P Nguyen
(74) *Attorney, Agent, or Firm* — Alleman Hall Creasman & Tuttle LLP

(57) ABSTRACT

A backlight unit for a display device comprising a chassis, a reflector affixed to the chassis, optical sheets affixed to the chassis, one or more light emitters affixed to the chassis, and optically-calibrated internal support structures. There is an air gap between the reflector and the optical sheets. The optically-calibrated internal support structures are disposed within the air gap and affixed to the chassis. The optically-calibrated internal support structures are configured to increase rigidity of the chassis, and to substantially not alter the uniformity of light emitted by the one or more light emitters through the optical sheets.

18 Claims, 7 Drawing Sheets

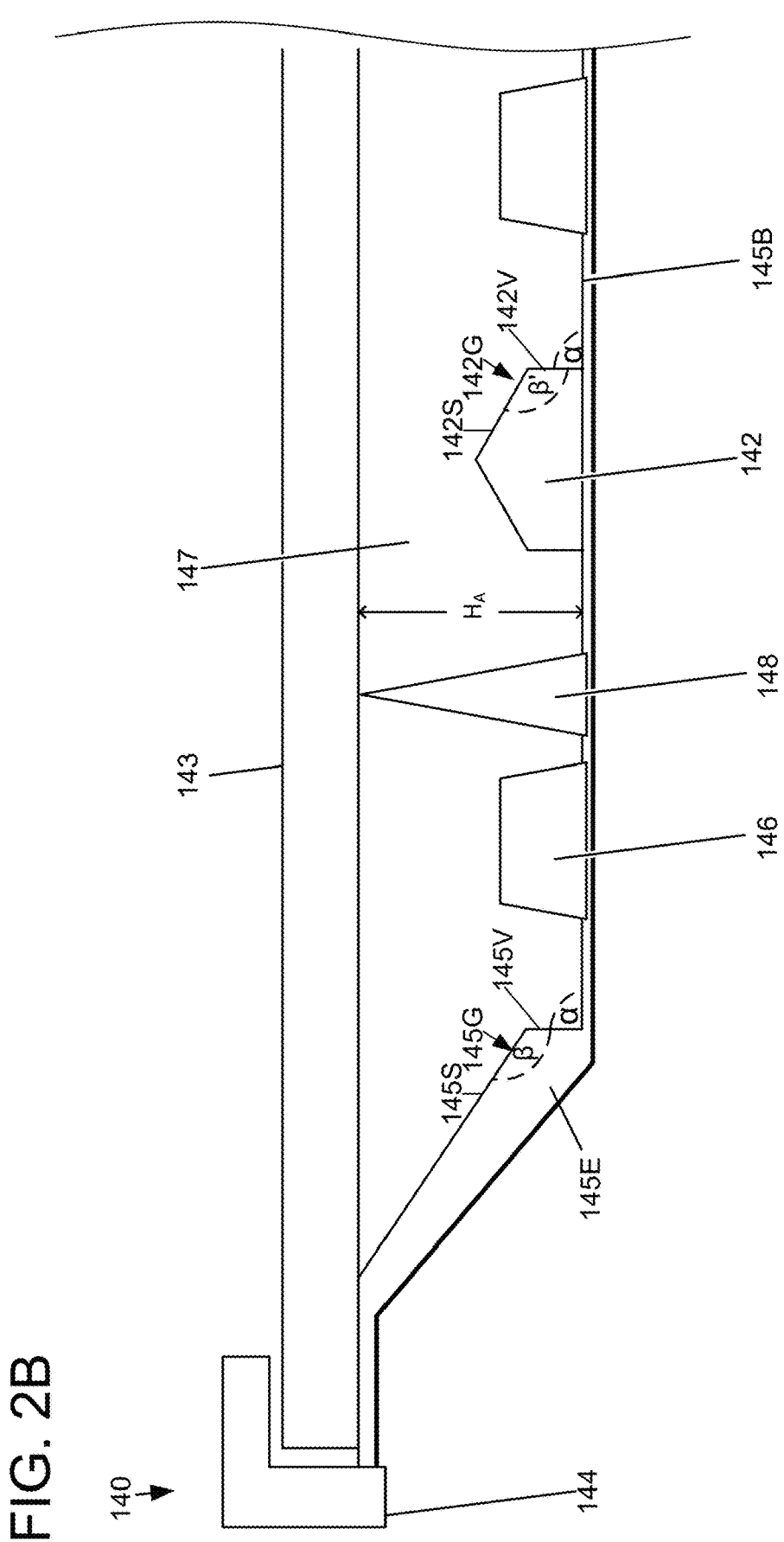

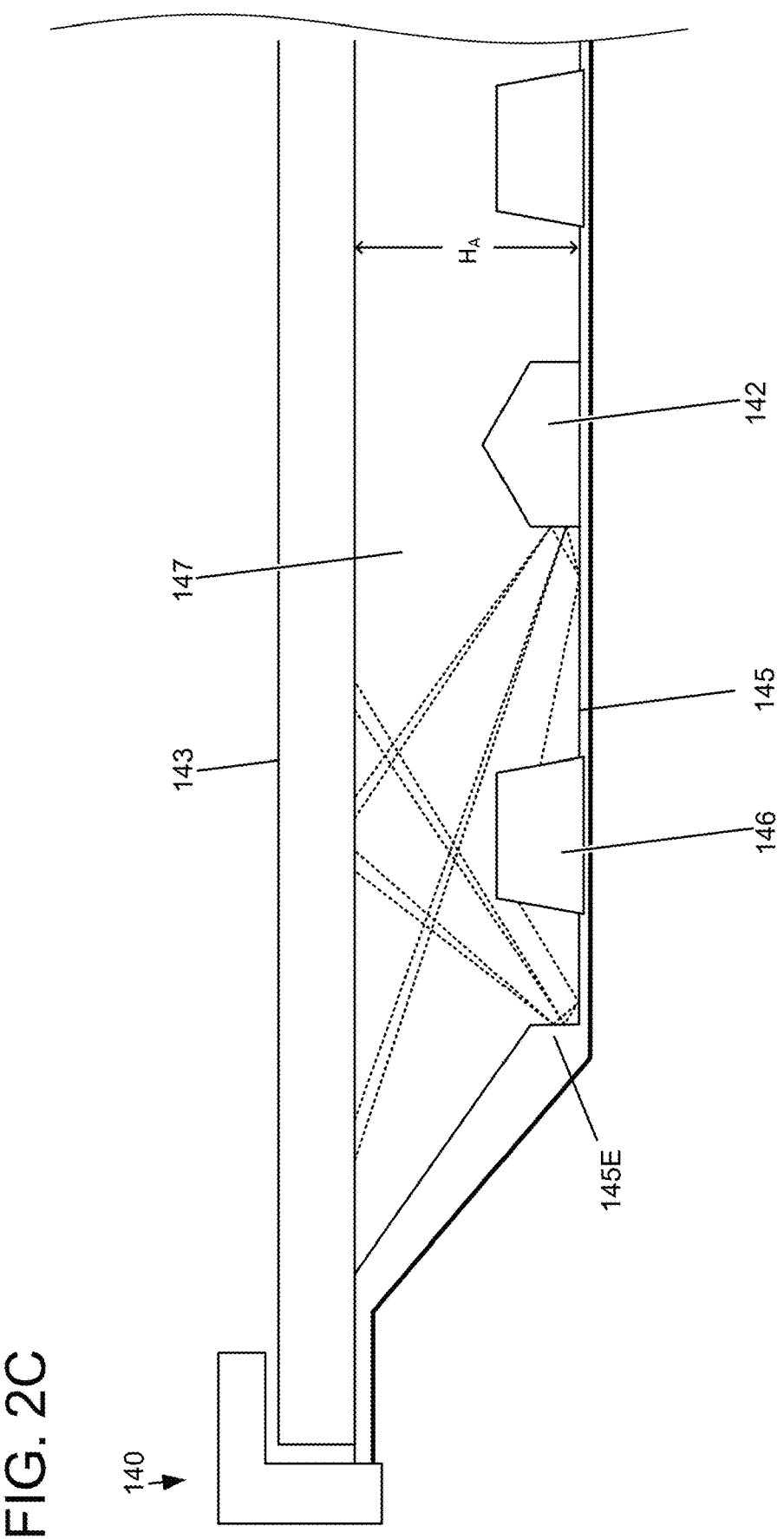

OPTICALLY-CALIBRATED BACKLIGHT UNIT INTERNAL SUPPORTS

CROSS REFERENCE TO RELATED APPLICATIONS

This application claims priority to U.S. Provisional Patent Application Ser. No. 62/742,085, filed Oct. 5, 2018, the entirety of which is hereby incorporated herein by reference for all purposes.

BACKGROUND

There is increasing demand for displays with a large area and thin profile. A thin device profile may allow installation and usage in more environments (e.g., due to space limitations and accessibility requirements) and be more aesthetically pleasing.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A backlight unit for a display device comprises a chassis, a reflector affixed to the chassis, optical sheets affixed to the chassis, one or more light emitters affixed to the chassis, and optically-calibrated internal support structures. There is an air gap between the reflector and the optical sheets. The optically-calibrated internal support structures are disposed within the air gap and affixed to the chassis. The optically-calibrated internal support structures are configured to increase rigidity of the chassis, and to substantially not alter the uniformity of light emitted by the one or more light emitters through the optical sheets.

BRIEF DESCRIPTION OF THE DRAWINGS

FIGS. 2B-2C show cross-section views of the BLU of FIG. 2A.

DETAILED DESCRIPTION

Figure 1B:
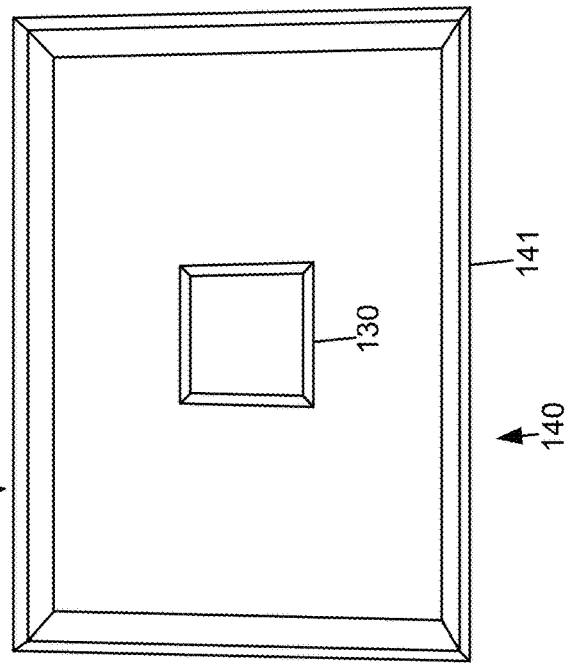
FIGS. 1A-1C respectively show front, back and cross-section views of a display device having a backlight unit (BLU) with internal support structures.

Display devices are useful in a variety of scenarios, e.g., for displaying information, viewing media content, editing documents and interacting with computer programs. Large display devices may enhance visibility and/or allow presentation of a larger amount of visual content. Accordingly, large display devices are often desired for installation in homes, offices, public spaces, etc. However, installation of display devices in such spaces may be constrained by space requirements, space usage regulations, safety codes (e.g., accessibility/fire code rules). Furthermore, installation of a display device may be constrained by the weight of the display device being smaller than a maximum weight tolerated by mounting devices/fixtures (e.g., a maximum weight for affixing a television mount to a wall in a home or office based on structural properties of the wall). Large display devices may be heavy and/or occupy a large volume, which may limit the scenarios in which they can be installed and used.

Accordingly, large display devices with a thin profile (e.g., small in a depth dimension orthogonal to the viewing surface) may be desirable, since thin display devices may have a reduced weight and occupy less space, facilitating installation in a wider variety of environments. Devices with a sufficiently reduced weight may, for example, be installed via a single mounting assembly attached to a single location of the chassis (e.g., a rotational mount attached at a center of the back of the chassis, facilitating rotation into different orientations). However, optimizing for a thin device profile can lead to decreased rigidity of the device, making the device susceptible to deformation which can cause various problems with the cooperating structures (e.g., backlight, chassis, optical, and touch layers). Furthermore, if the device is mounted at a single location on the chassis (e.g., at the center of the chassis with a rotational mount), reduced rigidity may be even more of an issue, due to the possibility of forces being applied at the edges of the device away from the mount. In some examples, a user interacts with the device with touch and pen inputs (e.g., capacitive multitouch technology, as one non-limiting example). The user experience may be significantly degraded as device rigidity decreases, e.g., as the touch and pen inputs may deform the device, leading to degraded display quality and/or input fidelity.

When displays are not sufficiently rigid, they may be deformed when subjected to external forces. Such deformation may temporarily and/or permanently degrade functioning of the display (e.g., by damaging internal components of the display chassis, backlight, optical/display layers, and touch layers). When thin profile is a design priority for a device, it may be difficult to achieve sufficient rigidity to prevent performance-degrading deformation.

The present disclosure is directed to optically-calibrated internal supports which can be used to increase rigidity of a display device. The optically-calibrated internal supports are installed in an air gap in the device backlight unit (BLU) between the chassis and the optical sheets of the backlight unit. Although display device BLUs may have internal air gaps, adding additional components (e.g., internal supports) to BLU air gaps may compromise optical uniformity of illumination provided by the backlight, which may compromise image quality of the display device. The optically-calibrated internal supports stiffen the display device so that it is better able to hold a substantially flat shape, without compromising the uniformity of illumination. The increase to stiffness without compromising illumination is achieved via tuning the internal supports to calibrate the shape, position, color, texture, and/or color/texture patterning of the internal supports with regard to the optical characteristics of the BLU.

Figure 1A:
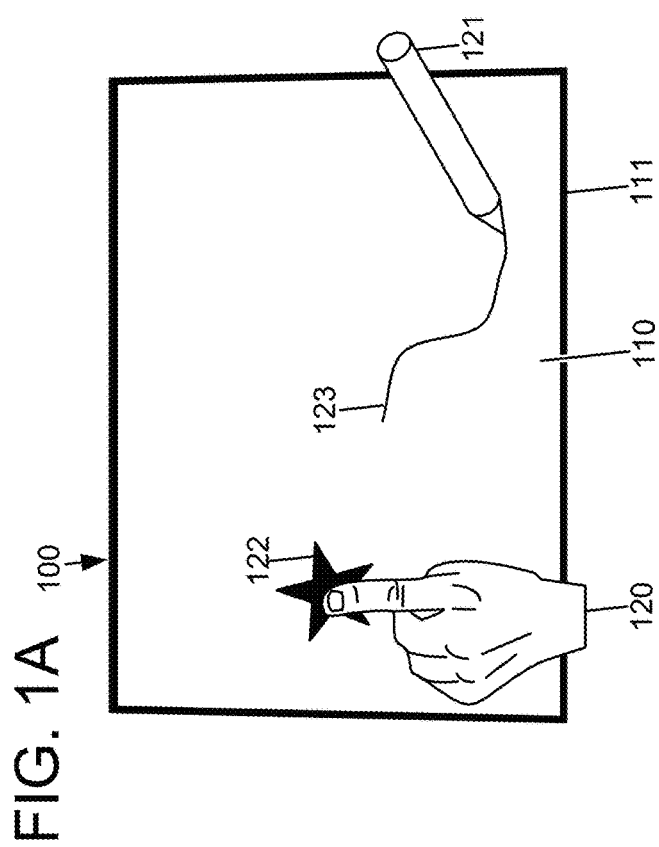

FIG. 1A shows a front view of a display device 100. Display device 100 is configured to present any desired content, e.g., content received from computer devices in cooperation with display device 100, content presented by an on-board computer module in a common enclosure of display device 100, content received over a computer network, content received as an analog and/or digital video feed from any other device, etc.

Display device 100 includes a touch display module (TDM) 110 including a display screen. TDM 110 further includes one or more sensors. Each of the sensors is configured to recognize proximity and/or contact of one or more input objects, e.g., human hands/fingers, stylus input objects, etc. Accordingly, TDM 110 is configured to present interactive graphical content in order to allow interaction using input objects. Although display device 100 is described with regard to TDM 110, a display device according to the present disclosure may include a display module without touch sensing capabilities, e.g., a non-touch display. A display device according to the present disclosure may include any suitable combination of sensor/input devices (e.g., buttons, remote control, keyboard, mouse, game controller, etc.), instead of or in addition to touch sensors. In some examples, a display device may be configured for display output without any interactive/input/sensory capabilities.

FIG. 1A shows non-limiting examples of input objects with which TDM 110 is configured to interact, including a hand/finger 120 of a human user and/or a stylus 121. TDM 110 is configured to present content in response to sensing proximity and/or contact of input objects, e.g., star shape 122 in response to contact of hand 120, and curve 123 in response to detecting contact of stylus 121 at the surface of TDM 110. Presentation of interactive content may be controlled by one or more computer devices included within and/or communicatively coupled to display device 100, e.g., personal computer devices, mobile phone devices, server devices, compute module devices included in display device 100, etc.

TDM 110 may be implemented via any current and/or future display and sensor technologies. As a non-limiting example, TDM 110 may incorporate a liquid crystal display (LCD) for displaying graphical content, e.g., photographic images, video, graphical user interfaces (GUI), etc. As a non-limiting example, TDM 110 may incorporate a capacitive sensor layer for sensing contact of input objects, e.g., an indium tin oxide layer. Further non-limiting examples of sensor technologies which may be incorporated in TDM 110 include resistive sensor layers, photographic sensor layers (e.g., IR photography), and/or acoustic sensor layers. In some examples, TDM 110 may be configured to detect proximity of input objects in addition to contact, e.g., by detecting a "hovering" input object with infrared photography.

An active display area of TDM 110 may be surrounded by a black mask 111. Black mask 111 may be of any desired thickness, e.g., in order to cover non-active areas of the display of TDM 110, to frame the display of TDM 110 (e.g., to provide contrast with content visible in the display of TDM 110), and/or to hide mechanical features of a bezel of display device 100. Black mask 111, non-active display areas of display device 100, and/or a bezel of display device 100 may be minimized in size (e.g., in thickness of area surrounding active areas of the display of TDM 110) using any suitable current and/or future techniques.

FIG. 1B shows a back view of display device 100. Display device 100 includes a rotational mount 130 and a backlight unit (BLU) 140 including a BLU chassis 141. BLU chassis 141 may function as the back chassis of display device 100, or additional material/layers may be added to the rear of the device.

BLU chassis 141 is configured to emit diffuse, uniformly distributed light towards and through the TDM 110, thereby illuminating the TDM 110. Emission of uniformly distributed light by the BLU chassis 141 enables display of high-quality imagery. Non-uniform lighting can cause localized variation in brightness of displayed content, resulting in content being possibly being obscured, misinterpreted by the viewer, or otherwise degraded in fidelity.

Rotational mount 130 allows display device 100 to be mounted against a wall, stand, etc., and enables display device 100 to be rotated/moved. Rotational mount 130 is configured for in-plane rotation of the display device to a variety of positions (e.g., portrait position, landscape position, etc.). As indicated, rotational mount 130 may be disposed near the center of the display device (e.g., centered relative to BLU chassis 141). Rotational mount 130 may be any suitable rotation assembly. In some examples, rotational mount 130 may be actuated by a motor (e.g., for manual and/or automatic control using an input switch and/or control by a computer device). In some examples, rotational mount 130 may be configured to lock into a plurality of pre-configured positions, e.g., portrait and landscape. In some examples, rotational mount 130 may allow smoothly rotating display device 100 into a range of positions and locking rotation at any rotation angle in order to hold a desired position. Display device 100 may alternately or additionally include any other desired bearing/coupling mechanism for mounting display device 100, e.g., a ball-and-socket, slider, hinge, etc.

Although a rotational mount 130 may allow mounting and flexibly orienting the display device 100 in a variety of usage scenarios, when a display device is held by a mount that is affixed to a single, localized portion of the chassis, the display device may experience increased deformation due to external forces (e.g., strain due to the weight of the display device pulling against the mount, forces due to interaction with input objects, etc.) as the external forces may be applied to the display device at a relatively large distance from the mounting assembly, e.g., at an edge/corner of the device. The application of forces at a large distance from the mounting assembly may result in a relatively larger leverage that compounds the total forces (e.g., torque forces) acting on the display device, relative to mounting techniques that affix the display device at multiple localized portions of the display device chassis (e.g., mounting at corners/edges of the display device).

Display device 100 may be implemented in a wide variety of form factors, including different shapes, sizes, aspect ratios, etc. In some examples, display device 100 may be a large-format device suitable for use as a computer monitor; television; collaborative device for conference rooms or to enable other shared experiences; kiosk display; etc. As a non-limiting example, display device 100 may have a diagonal dimension of 24 inches, 36 inches, 48 inches, or larger, and in any suitable aspect ratio.

Display device 100 is formed as a stack of layers and cooperatively connected components, including the rotational mount 130, BLU 140 including BLU chassis 141, and TDM 110. Display device 100 may be constructed in a modular fashion (e.g., by laying down and affixing successive layers of TDM 110 and BLU 140, BLU chassis 141, and rotational mount 130 (attached directly to the chassis of BLU chassis 141). BLU chassis 141 along with TDM 110 may facilitate a thin display device with a small depth (e.g., Z dimension orthogonal to the display surface), e.g., 50 mm or smaller. A display device with a small depth may have a correspondingly light weight. The smaller weight and volume may facilitate shipping, carrying, and/or mounting of the display device, among other benefits. Furthermore, a display device with a small depth may be mounted to take up very little space (e.g., mounted flush with a wall), which may enhance aesthetics or provide other benefits.

However, thin display devices with a small depth may be relatively less rigid (e.g., as compared to display devices of a similar construction with a larger depth). For example, the resistance to deflection of a display device chassis may be substantially determined by the area moment of inertia of the chassis. Accordingly, a thin chassis may have a correspondingly thin cross section with a very small area moment of inertia. Therefore, thin display devices may be more easily deformed when subject to external forces. For example, in a typical usage, a display device may be subject to forces from gravity, rotation into different orientations, and/or contact by input objects during user interaction.

Deformation of a display device may cause bending of the chassis as well as internal structures (e.g., BLU and TDM structures). Bending of the chassis and internal structures may cause various problems that degrade display device functionality and structural integrity of various components. Furthermore, structures of the chassis may impinge on structures associated with image display. For example, a BLU may include an optical sheet configured to direct diffuse light towards a TDM. However, if the optical sheet is bent or impinged upon by chassis structures, light may be directed non-uniformly through the optical sheet, resulting in degraded uniformity of illumination. In another example, if the BLU bends so that it pushes on the TDM, resulting in pressure on the LCD and temporary and/or permanent degradation of image quality in the LCD (e.g., LCD mura). In another example, pressure on the TDM may cause spurious inputs to be detected by sensors of the TDM. Accordingly, it is desirable to keep all parts of the display device (e.g., chassis, BLU, and TDM) substantially flat and rigid. Rigidity of the display device may be particularly important when the display device is affixed by a mount at a single localized spot, e.g., centrally-placed rotational mount 130. For example, manipulation of the display device to reposition it relative to the rotational mount may result in a torque against the display device. Because the rotational mount is centrally located, torque and other forces applied near the edges/corners of the display device may cause significant deforming forces throughout the volume of the display device, e.g., bending/torsion/strain on the BLU chassis and other structures of the display device.

One approach to mitigate deformation of a display device is to mount the display device via stabilizing points near the edges/corners of the device. Another approach to mitigate deformation is to affix the display device chassis to external rigid reinforcements, e.g., a thick metal plate attached to the back of the chassis. However, these approaches may not be suitable for a display device 100 with a thin profile and a rotational mount. For example, mounting the device via attachments at corners and/or edges would preclude rotating the device into different positions, since the corners/edges of the device would be mounted to fixed positions. Furthermore, reinforcing the chassis of the device may add an undesirable amount of weight and/or thickness to the device.

Figure 1C:
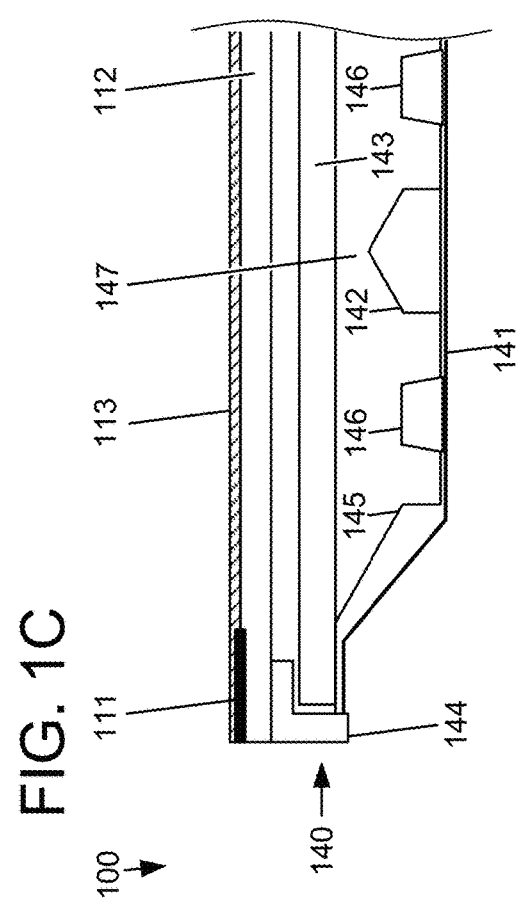

Accordingly, as shown in the cross-section view of FIG. 1C, display device 100 is configured to include optically-calibrated internal supports 142 that enhance rigidity, in order to mitigate/prevent deformation due to forces applied to various components of the display device. The optically-calibrated internal supports 142 may extend along a portion of length of device chassis in the shape depicted in FIG. 1C or any other optically-calibrated shape, as will be described herein.

The TDM includes display and sensor layer 112, black mask 111, and cover glass 113. Display and sensor layer 112 may be implemented via any suitable TDM technologies as described above. The TDM layers may be attached to each other, and attached to the BLU or to any other suitable component of display device 100 with optically-clear adhesive or any other attachment technique.

The BLU 140 of display device 100 includes BLU chassis 141 (which optionally forms the chassis of display device 100 or is integrated/coupled to an additional chassis of display device 100), and internal components configured to provide diffuse, uniform light through TDM 110.

The BLU chassis 141 may be formed from sheet metal or any other suitable material. BLU chassis 141 may be substantially flat (e.g., the horizontal section shown at the bottom of FIG. 1C) and slope/bevel at edges of display device 100. BLU chassis 141 may be any suitable thickness, e.g., 1.25 mm thick, or thinner. A display device 100 according to the present disclosure may be constructed with a relatively thin BLU chassis 141, relative to other chassis construction techniques, based on the enhanced rigidity provided by internal supports 142.

The BLU includes a reflector 145 affixed to the interior of BLU chassis 141. The BLU includes optical sheets 143 affixed to the chassis (e.g., held in place by panel guide 144). Optical sheets 143 are affixed to the chassis, but separated from reflector 145 by an air gap 147. The BLU includes one or more light emitters, e.g., LEDs 146. The BLU further includes optically-calibrated internal supports 142 in air gap 147 between the reflector 145 and the optical sheets 143. Air gap 147 has a height $H_A$ resulting in an internal volume of BLU 140 in which light may be diffused, reflected, and/or redirected before being directed through optical sheet 143. Typically, light will be directed from the LEDs using LED lenses, though for simplicity the discussion herein will refer to LED/lens assemblies as LEDs. Although the examples in the present disclosure are described with regard to LEDs as light emitters, any other suitable light emitting technology may be used alternately or additionally to LEDs.

Reflector 145 may be a diffusely reflective material (e.g., textured plastic sheet, coated sheet metal, etc.) of any suitable thickness (e.g., 0.75 mm thick or thinner; preferably 0.30 mm thick or thinner). Surface texturing/color patterning for reflector 145 (and internal supports 142) will be described further below with regard to FIGS. 5A-5C. LEDs 146 are configured to emit light downward towards the reflector, via lenses, at a relatively wide/shallow angle (i.e., relative to the horizontal plane of the reflector), to illuminate the reflector 145. Illumination of reflector 145 results in diffuse reflection of light from the reflector towards the optical sheets 143. Reflector 145 has a shape configured to provide uniformly distributed, diffuse light through optical sheets 143 at the edges of the BLU. Optical sheets 143 are configured to direct the uniform, diffuse light through the TDM layers, thereby providing uniform light to facilitate display of images by the TDM. Optical sheets 143 may include any suitable optical layers, e.g., prisms, diffusers, etc.

Reflector 145 may include an optically-calibrated edge geometry, configured to, in cooperation with other structures, diffusely and uniformly reflect light towards optical sheets 143. The optically-calibrated edge geometry may include any suitable curvature/angles around an edge of the BLU, e.g., the sloped geometry at the left side as shown in FIG. 1C. Reflector 145 may be shaped as shown in FIG. 1C or in any other suitable shape/proportion. As a non-limiting example, a reflector may include a slope along the beveled portion of the chassis (the left side of FIG. 1C), e.g., at a 15 to 45 degree angle relative to the bottom, flat portion of the chassis. The reflector 145 shape may further include a "step"-shaped drop from the slope, which forms a 90-degree angle with the bottom portion of the chassis, as will be described below. Optically-calibrated internal supports 142 may be rigid internal support structures that are affixed (e.g., rigidly coupled) to BLU chassis 141. Optically-calibrated internal supports 142 are disposed between LEDs 146. In an example, optically-calibrated internal supports 142 are disposed equidistant between two LED rows or between two LED columns. Optically-calibrated internal supports 142 are configured to increase rigidity and resistance to deformation of BLU chassis 141, by increasing area moment of inertia of the BLU chassis 141 (e.g., by locally increasing thickness of the cross section of the BLU chassis 141). Optically-calibrated internal supports 142 may be elongate to provide stiffening, e.g., to provide resistance to deformation along the length of the elongate supports. Optically-calibrated internal supports 142 are configured with a sufficient height that increases an effective area moment of inertia of the rigidly coupled optically-calibrated internal supports 142 and the BLU chassis 141 to provide sufficient rigidity. Accordingly, optically-calibrated internal supports 142 may mitigate or prevent problems caused by deformation, thereby improving performance and structural integrity of the display device 100. In an example, reflector supports 142 have a height of approximately ⅓ of the height of the air gap 147 between the reflector base 145B and optical sheets 143.

Internal supports may interfere with light paths in the BLU, potentially affecting illumination. Furthermore, while a larger height of internal supports may increase rigidity, a larger height of internal supports may also cause greater interference with light paths in the BLU. Accordingly, optically-calibrated internal supports 142 may be configured to avoid interfering with the transmission of uniformly distributed, diffuse light through optical sheets 143, even as taller internal supports are used to provide increased rigidity. Optically-calibrated internal supports 142 substantially do not alter the uniformity of light emitted by the one or more light emitters through the optical sheets.

As used herein, whether the optically-calibrated internal supports 142 "substantially do not alter" uniformity of light emitted through the optical sheets may be determined in any suitable manner. For example, such determination may be with regard to whether a difference in uniformity of illumination, depending on presence or absence of the optically-calibrated internal supports, is visible to a typical human observer.

In some examples, whether or not uniformity of illumination is substantially altered by presence/absence of the optically-calibrated internal supports may be measured/characterized by a "Just Noticeable Difference" (JND) and/or "Luminance Just Noticeable Difference" (LJND) measurement system for quantifying image uniformity variation. In some examples, The JND/LJND measurement system may quantify variation in lighting uniformity based on estimating whether such variation is visible to a standard human observer. In some examples, uniformity of illumination may be determined to be not substantially altered if a JND score is below a predefined threshold. For example, a JND score below 1.0 may be considered acceptable. Accordingly, if optically-calibrated supports are added to a backlight and the JND score for light emitted through different parts of the optical sheet surface remains below 1.0, then the optically-calibrated supports may be assessed to substantially not alter uniformity of light emitted through the optical sheets. It is believed that optically-calibrated internal supports according to the present disclosure result in acceptable JND scores. In some examples, addition of optically-calibrated internal supports according to the present disclosure may result in maximum JND scores of less than 0.5, indicating that uniformity of light emitted through the optical sheets is substantially not altered. In some examples, addition of optically-calibrated internal supports according to the present disclosure may result in an increase in JND score of near 0 (e.g., less than 0.25).

In some examples, uniformity of illumination may be measured based on measurements of Area Uniformity and/or Area Contrast Uniformity. In some examples, uniformity of illumination may be measured with regard to a model of human perception (e.g., an empirical model, and/or a contrast-sensitivity function). For example, a given variation in luminance intensity may be measured as a more severe variation at different overall luminance intensities (e.g., a "mura" defect with the given variation in luminance intensity may be more visible to human observers in the context of a dark gray color than in the context of a lighter gray color). In some examples, uniformity of illumination may be measured with regard to a Standard Spatial Observer method, or any other suitable human vision model. In some examples, uniformity of illumination may be measured by quantifying defects in uniformity (e.g., "mura" defects). In some examples, uniformity of illumination may be measured based on quantifying local variation (e.g., such measurement may account for and/or disregard broad changes in lighting uniformity).

It is believed that optically-calibrated internal supports 142 according to the present disclosure may increase rigidity of the BLU, without substantially altering uniformity of illumination (e.g., as measured in any suitable manner, as described above). For example, optically-calibrated internal supports 142 may be added to a BLU without perceptibly altering uniformity of light emitted through the optical sheets of the BLU, and/or without measurably showing an increase in luminance non-uniformity (e.g., "mura" defects), as measured by laboratory instrumentation and/or human visual perception experiments (e.g., JND measurements).

In some examples, optically-calibrated internal supports 142 may be configured with a shape configured to enhance diffusion and uniformity by avoiding occluding/shadowing light emitted from the LEDs 146 and/or reflected from reflector 145. This may avoid concentrating light in a local area of optical sheets 143. Accordingly, the BLU may emit uniformly distributed, diffuse light (e.g., without any bright spots, dark spots, specular highlights, etc.) while still receiving the structural benefits of supports 142.

The shape, texture, color patterning, and placement of the optically-calibrated internal supports 142 may be adapted for a particular BLU design, e.g., with regard to the LED placement and light emission angle, reflector materials and shape, and optical sheet technology used in the BLU. In some examples, optically-calibrated internal supports 142 may have a substantially similar shape and/or size to the edge of reflector 145 (e.g., as shown along the left of FIG. 1C).

For example, when reflector 145 has an optically-calibrated edge geometry, optically-calibrated internal support structures 142 may have an optically-calibrated edge geometry conforming to the optically-calibrated edge geometry of reflector 145. The conforming optically-calibrated edge geometries may be achieved by similar and/or congruent shapes. For example, the optically-calibrated edge geometries for the reflector 145 and optically-calibrated internal support structure 142 depicted in FIG. 1C include congruent vertical sections extending from the chassis 141, and sloped sections extending from the vertical sections at congruent angles. The optically-calibrated edge geometries for the reflector and support structure may include identical angles and/or proportions, and/or angles that are similarly defined within a threshold range (e.g., 5 degrees) for corresponding angles/sides within the respective edge geometries. The optically-calibrated edge geometries may be substantially similar, but changed with regard to proportion or aspect ratio, etc.

In some examples, optically-calibrated internal supports 142 and reflector 145 may be given a texture and/or color pattern configured to increase the diffuse and uniform character of illumination within the BLU.

Figure 2A:
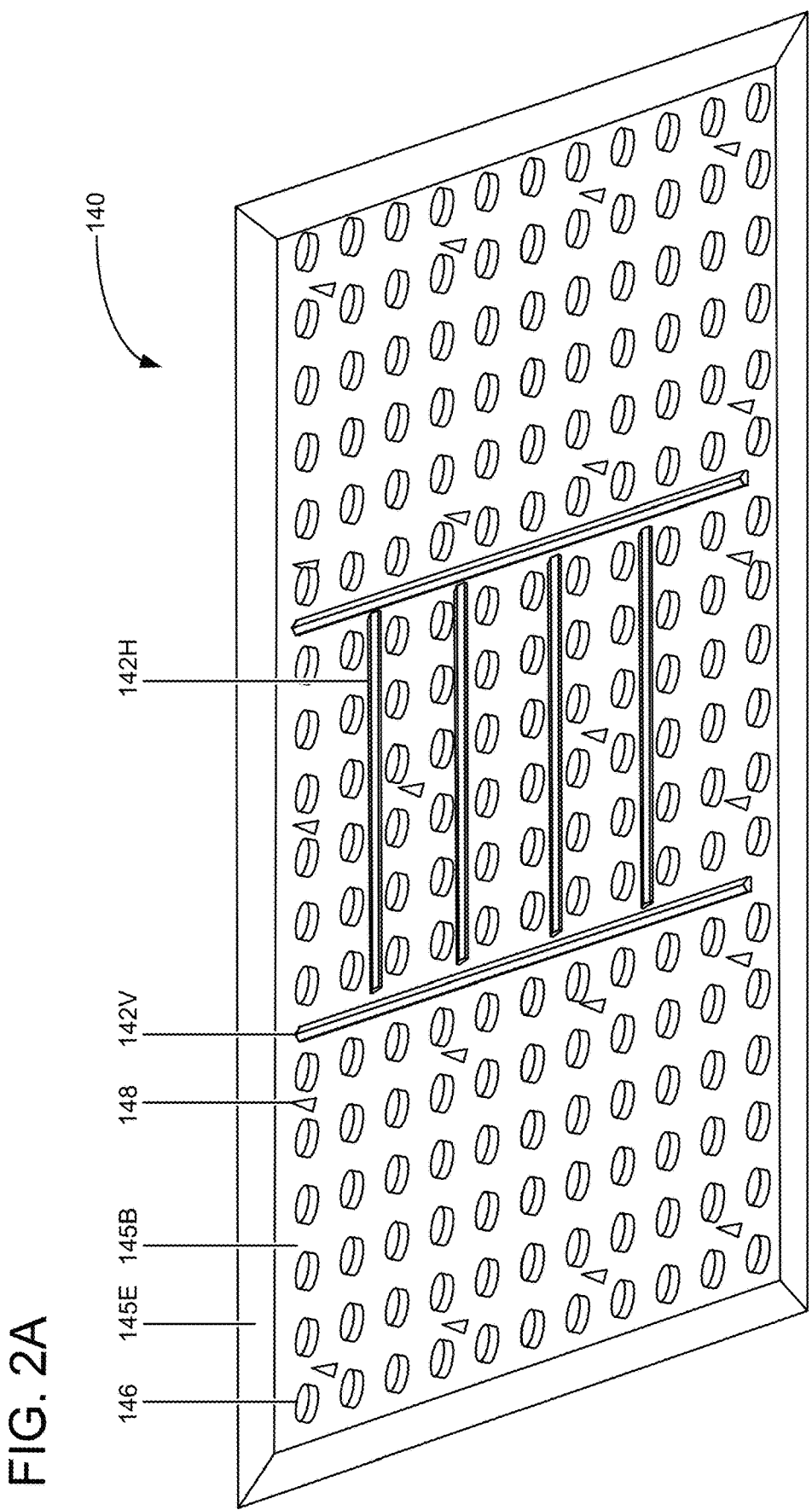
FIG. 2A shows a perspective view of a BLU, including LEDs and support structures disposed in the interior of the BLU.

FIG. 2A shows portions of an exemplary BLU 140 from the front (e.g., viewing the internal components of the BLU 140). BLU 140 is shown without any optical sheets, and BLU 140 is shown not attached to any TDM assembly. BLU 140 includes a reflector 145 comprising a reflector edge 145E and reflector base 145B. Reflector 145 is affixed to a top of the BLU 140 chassis.

BLU 140 includes LEDs 146 arranged in a grid of rows and columns. Although BLU 140 is depicted with 11 rows of 16 LEDs per column (e.g., 176 LEDs total), a BLU according to the present disclosure may be made with any number of LEDs in any appropriate arrangement. Although the LEDs 146 are depicted in a uniform grid arrangement, in other examples, LEDs may be spaced with a varying pitch along one or both of the X and Y dimensions, e.g., with varying X spacing and constant Y spacing. In one example, spacing between LEDs is varied along the X dimension by placing LEDs more closely together near the center and further apart at the left and right sides of the BLU 140.

BLU 140 further includes a plurality of optical sheet supports 148 affixed to the chassis (e.g., embedded through or in the reflector). The optical sheet supports 148 may be small pins configured to hold up an optical sheet to prevent sagging/bending of the optical sheet toward the reflector base. Optical sheet supports 148 may include springs and/or soft, compliant material (e.g., at a tip of each pin) to ensure that they do not impinge on the optical sheet if the optical sheet and/or chassis are deformed within a limited range. However, if the chassis is deformed sufficiently, optical sheet supports 148 may nonetheless impinge on the optical sheets.

In the example of FIG. 2A, the rigidity of BLU chassis 141 is enhanced by a plurality of optically-calibrated internal supports 142, including horizontally arranged internal supports 142H and vertically arranged internal supports 142V. Although FIG. 2A shows both horizontal and vertical supports, a display device may alternately include only horizontal and/or only vertical supports (or supports arranged at various other angles). Furthermore, the depicted arrangement of internal supports is not limiting. For example, a display device may have vertical and/or horizontal supports in a non-bilaterally symmetric (e.g., asymmetric or rotationally symmetric arrangement). Optically-calibrated internal supports 142 may be distributed across substantially the entire surface of the reflector 145 and/or chassis 141. Alternately, optically-calibrated internal supports 142 may be distributed across only certain localized areas, e.g., to provide reinforcement in areas of the chassis that may potentially experience larger torque and other forces. Optically-calibrated internal supports 142 are rigidly coupled to the chassis and enhance the effective area moment of inertia of the chassis, providing additional rigidity and resistance to deformation. FIG. 2A shows an exemplary arrangement of optically-calibrated internal supports 142, but optically-calibrated internal supports may be arranged in any other desired arrangement (e.g., according to design constraints of a BLU and/or display device including the amount of reinforcement needed for sufficient rigidity, placement of internal components, etc.). For example, optically-calibrated internal supports 142 may be placed to ensure that there are some vertical supports 142V and some horizontal supports 142H, and taking the placement of LEDs 146 and optical sheet supports 148 into account. Optically-calibrated internal supports 142 may have any suitable length.

FIG. 2B shows a portion of an exemplary BLU 140 in cross-section view. In FIG. 2B, the BLU 140 is shown with optical sheets 143 affixed with panel guide 144 and supported in place by optical sheet supports 148. As in FIG. 2A, the BLU 140 is shown without any TDM module, to focus on the structural and optical features of the optically-calibrated internal supports 142.

As in FIG. 2A, BLU 140 includes a reflector 145 comprising a flat reflector base 145B and a reflector edge 145E with a sloped/stepped shape The reflector has an optically-calibrated edge geometry 145G including a vertical section 145V and a sloped section 145S. As shown, the reflector edge 145E may initially step up (e.g., at a 90-degree angle from the base) before sloping more gradually. Reflector edge 145E initially has an angle of α from the reflector base 145B, where α may be close to 90 degrees. For example, α may be within 20 degrees of 90 degrees. More preferably in some examples, α may be within 5 degrees of 90 degrees. Reflector edge 145E then slopes at an angle β. As shown, β may be approximately 135 degrees, so that the sloped section of reflector edge 145E is at approximately 45 degrees to the flat portion of the reflector base 145B. The initial step upward at the angle of α may facilitate the uniform reflection of light from LEDs 146 towards different areas of optical sheets 143, e.g., by preventing direct specular reflection of light from an LED 146 from the sloped section of reflector edge 145E toward the optical sheets. It is desirable for light from LEDs in a BLU to reflect off of reflector surfaces at shallow angles (e.g., relative to the reflector base or edge surfaces) and/or for the reflector to provide highly diffusive reflection. For example, reflection at shallow angles may facilitate a light path that includes multiple diffuse reflections, with diffusion of light in each reflection compounding to result in highly diffuse, uniformly distributed light being transmitted from the BLU. Furthermore, reflection at shallow angles on a diffusive reflector surface may minimize direct specular reflection of light from the LEDs towards the optical sheets.

As in FIG. 2A, BLU 140 includes one or more optically-calibrated internal supports 142. Optically-calibrated internal supports 142 are configured with similar geometry to reflector 145, in order to facilitate uniform illumination with light reflected from LEDs 146. The optically-calibrated internal supports 142 may have an optically-calibrated edge geometry 142G including a vertical section 142V and a sloped section 142S In particular, the side profiles of the supports may mimic the shape/geometry of reflector edge 145E, e.g., so that the geometric definition of vertical section 142V is related to that of vertical section 145V, and similarly for sloped section 142S and sloped section 145S. For example, as shown, optically-calibrated internal supports 142 have an initial step up at an angle of α', where α' may be similar/identical to α. Optically-calibrated internal supports 142 then slope at an angle of β', where β' may be similar/identical to β. In an example, α' is within 5 degrees of α and β' is within 5 degrees of β. Still further, as shown, the initial "step" portion of optically-calibrated internal supports 142 is of a similar height to the analogous portion of the reflector edge 145E. In some examples, optically-calibrated internal supports 142 for BLU 140 may have a height between ⅓ and ½ of the height $H_A$ of the air gap 147. This may provide desirable structural support and stiffening while minimally affecting the uniformity of diffuse light within the BLU.

The conforming character of the reflector edge and side portions of the internal supports may contribute to the uniform illumination within the BLU's internal cavity. In particular, the use of conforming geometries creates a situation where most/all of the protruding structures within the BLU cavity are distributed within the BLU cavity and interact with emitted light to produce similar shallow reflections. As a result, by the time that reflected beams reach the optical sheets, they are relatively diffuse and well distributed.

FIG. 2C shows an example of reflection and diffusion of light from an LED 146 inside of BLU 140. Optical sheet supports 148 are LED 146 is configured to emit light at various downward angles towards the reflector 145 and/or optically-calibrated internal support 142, so that emitted light is reflected towards the optical sheets 143. Preferably, the emitted light is diffusively reflected one or more times before reaching optical sheets 143, so that light from the LEDs is not concentrated at any one region of the optical sheets 143.

FIG. 2C depicts two exemplary light paths of representative light rays from LED 146, shown as dotted lines emanating from the LED. After bouncing off reflector 145 and/or optically-calibrated internal support 142, the light is at least partially diffused so that the light is spread across a wider region. FIG. 2C illustrates light being diffused by illustrating two rays within a relatively narrow angle, but it should be understood that diffusive reflection off of reflector 145 and/or optically-calibrated internal supports 142 may result in spreading light uniformly, and/or in more rays, across a wider angle.

The two exemplary light paths shown in FIG. 2C from LED 146 to optical sheets 143 each involve two reflections before the optical sheets 143 are reached. Referring to the left side of LED 146, light angles downwardly from the LED to diffusively reflect off the base of reflector 145 (the diffuse, as opposed to specular, character of the reflection is indicated simplistically by the two outbound rays from the reflection point). These two outbound rays from the first diffusive reflection then diffusively reflect off the vertical sidewall of reflector edge 145E, in turn each producing two of their own rays, such that four rays from the initial LED ray reach the optical sheets 143. Accordingly, the light path from the LED to the optical sheets involves reflecting off of two surfaces—the base of the reflector and the sidewall of the reflector edge (left side of LED) or the base of the reflector and the sidewall of the internal support (right side of LED). As illustrated, the diffusive reflection results in light from the LED 146 being spread across a wide region of the optical sheets 143. Further, the vertical 90-degree sidewalls of the reflector edge and the internal support may enhance diffusion of light produced by the LED, by causing relatively shallow reflections relative to the reflector base and optical sheets and/or causing rays to travel a greater distance before reaching the optical sheets.

It will be understood that current and/or future diffusive materials for a diffusive, reflective surface of reflector 145 and/or optically-calibrated internal supports 142 may allow substantially more diffusion than illustrated in FIG. 2C. Accordingly, LEDs and reflectors of a BLU 140 may be configured to result in uniform distribution of light from the LEDs across a wide area of optical sheets 143.

FIG. 3A-3D show exemplary cross-section designs for optically-calibrated internal supports. These designs are shown with features having varying dimensions and angles. Where a given dimension/angle identifier is used for more than one figure, that does not necessarily imply that the values are the same—e.g., $H_1$ of FIG. 3A may be a distinct, unrelated value from $H_1$ of FIG. 3B. Exemplary values for each variable will be given with regard to each figure. Widths and heights will be given in terms of a height $H_A$ representing the height of an air gap of a BLU (e.g., air gap 147 shown in FIGS. 1C, 2B, and 2C), since performance in some cases for an internal support may depend on its geometry in relation to the size of the BLU air gap.

Figure 3A:
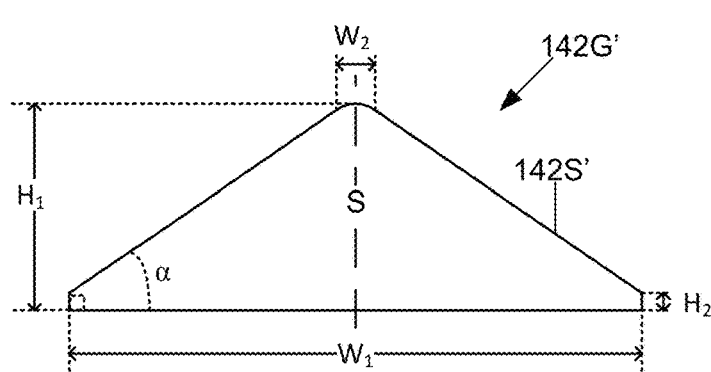
FIGS. 3A-3D show exemplary support structures for a BLU.

FIG. 3A shows a "shallow" design, in which an edge geometry 142G' of the optically-calibrated internal support structures has a cross sectional shape including a sloped section 142S' extending from a plane of the chassis at an angle between 25 and 40 degrees. The design is in the rough shape of an isosceles triangle with a base width of $W_1$ and a height of $H_1$. The triangle shape has a rounded top angle, and squared off side angles. The design is symmetric about a dashed line of symmetry labelled S. The top angle is rounded off in an approximately circular curve, with a diameter of approximately $W_2$. The identical side angles meet the base at an angle of α. In an example, α is approximately 31.5 degrees, e.g., within 5 degrees of 31.5 degrees. In some examples, $H_1$ is between approximately one quarter of the height of the air gap, $$\frac{H_A}{4},$$

and approximately half the height of the air gap, $$\frac{H_A}{2}.$$

In an example, $W_1$ is approximately $3 \times H_1$, $H_2$ is approximately $$\frac{H_1}{16},$$

and $W_2$ is approximately $$\frac{H_1}{16}.$$

Although FIG. 3A depicts internal supports with a rounded off top and squared off sides, it will be understood that other variations on the shape depicted may be employed (e.g., isosceles triangle shape, optionally with rounded off sides and/or top, squared off sides and/or top, additional cuts at any other suitable angle, etc.). For example, although FIG. 3A depicts an isosceles triangle with squared-off sides, alternately or additionally, cuts to the sides at other angles may be suitable. For example, instead of the squared-off angle (depicted by the small dashed square), the sides of the optically-calibrated internal support may be cut at any other angle within 20 degrees of 90 degrees. Preferably, the sides of the optically-calibrated internal support are cut at an angle within 5 degrees of 90 degrees (e.g., between 85 and 95 degrees). Similarly, FIGS. 3B-3D may be varied from the depicted cross sections (e.g., to calibrate optical properties for a particular BLU).

Figure 3B:
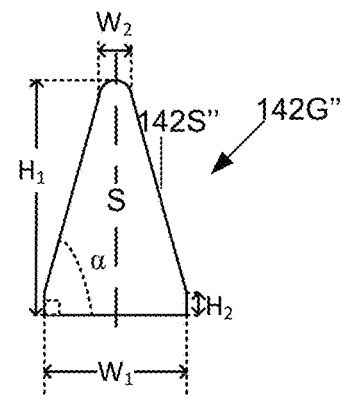

FIG. 3B shows a "sharp" design with an edge geometry 142G" including a sloped section 142S". Like the design of FIG. 3A, the design is symmetric, in the rough shape of an isosceles triangle with rounded top and squared off sides. The identical side angles meet the base at an angle of α. In an example, α is approximately 78 degrees, e.g., within 5 degrees of 78 degrees. In some examples, $H_1$ is between approximately one quarter of the height of the air gap, $$\frac{H_A}{4},$$

and approximately half the height of the air gap, $$\frac{H_4}{2}.$$

Preferably, $H_1$ is approximately $$\frac{H_A}{4}.$$

In an example, $W_1$ is approximately $$\frac{H_1}{2},$$

$H_2$ is approximately $$\frac{H_1}{16},$$

and $W_2$ is approximately $$\frac{H_1}{16}.$$

Figure 3C:
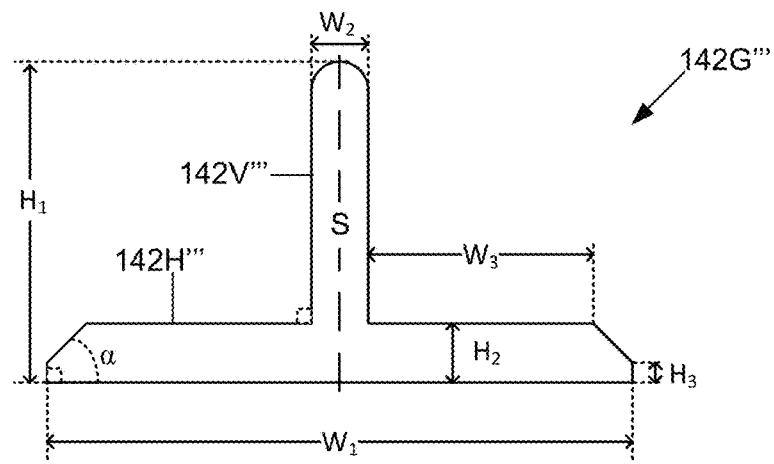

FIG. 3C shows a "tee"-shaped design, in which an edge geometry 142G''' of the optically-calibrated internal support structures has a cross sectional shape including a horizontal section 142H''' substantially parallel to the chassis, and a substantially vertical section 142V''' extending from the horizontal section 142H''' and substantially perpendicular to the horizontal section 142H''' and chassis. The substantially horizontal section may be within a suitable threshold angle relative to the chassis, e.g., within 5-10 degrees of parallel.

Similarly, the substantially vertical section 142V''' may extend from the horizontal section 142H''' within any suitable threshold angle relative to perpendicular from the horizontal section/chassis, e.g., within 5-10 degrees of perpendicular. Like the designs of FIGS. 3A and 3B, the design is symmetric. In an example, α is approximately 45 degrees, e.g., within 5 degrees of 45 degrees. In some examples, $H_1$ is between approximately one quarter of the height of the air gap, $$\frac{H_A}{4},$$

and approximately half the height of the air gap, $$\frac{H_A}{2}.$$

Preferably, $H_1$ is approximately $$\frac{H_A}{4}.$$

In an example, $W_1$ is approximately $2 \times H_1$, $W_2$ is approximately $$\frac{3}{16} \times H_1,$$

$H_2$ is approximately $$\frac{3}{16} \times H_1,$$

and $H_3$ is approximately $$\frac{H_1}{16}.$$

Figure 3D:
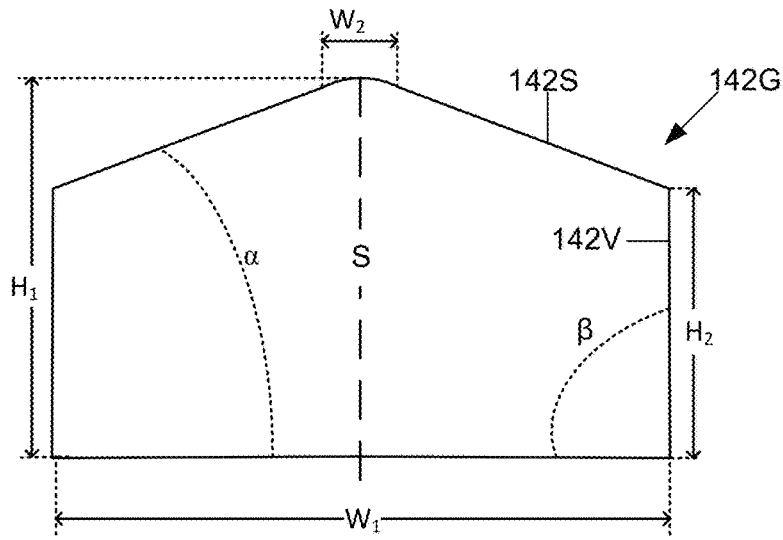

FIG. 3D shows a "stepped" design that mimics the stepped/sloped design of the edge of a reflector in a BLU, e.g., as shown in FIG. 2B. In the "stepped" design, the edge geometry 142 of the optically-calibrated internal support structures has a cross-sectional shape including a substantially vertical section 142V attached to the chassis and extending substantially perpendicular to a plane of the chassis, and a sloped section 142S extending from the vertical section. In examples, the sloped section 142S extends from the vertical section 142V at an angle of between 10 and 60 degrees relative to the plane of the chassis. The substantially vertical section 142V may extend from the chassis within any suitable threshold angle relative to perpendicular to the chassis, e.g., within 5-10 degrees of perpendicular. The vertical section 142V and the sloped section 142S comprise a first portion of a symmetric shape having two mirror-symmetric portions, and a substantially pentagonal shape (e.g., a pentagonal shape including a curved section at the top, as depicted). In some examples, the optically-calibrated internal support structures extend vertically from a plane of the chassis to a cross-sectional height of between one eighth and one half of a height of the air gap between the reflector and the optical sheets, e.g., to approximately one third of the height of the air gap. The design may have a conforming cross-sectional geometry (e.g., substantially the same cross-sectional geometry) as compared to a portion of a BLU reflector edge, e.g., a rightmost portion of the BLU reflector edge 145E shown along the left side of FIG. 2B. In an example, a is approximately 20 degrees. In an example, β is approximately 90 degrees. For example, β may be within 20 degrees of 90 degrees. Preferably, β is within 5 degrees of 90 degrees (e.g., between 85 and 95 degrees). In an example, $H_1$ is approximately one third of the height of the air gap, $$\frac{H_A}{3}.$$

In an example, $H_2$ is approximately $$\frac{7}{10} \times H_1,$$

$W_1$ is approximately $$\frac{5}{3} \times H_1,$$

and $W_2$ is approximately $$\frac{1}{10} \times H_1.$$

Optically-calibrated internal supports according to the present disclosure may improve rigidity of a BLU chassis without substantially affecting uniformity of illumination from the BLU. For example, an exemplary BLU similar to the one shown in FIGS. 1A-2C was constructed with optically-calibrated internal supports according to FIGS. 3B and 3C, with $H_1$ equal to approximately ¼ of the air gap height for the BLU, and the inclusion of optically-calibrated internal supports did not detectably affect uniformity of illumination. For example, an exemplary BLU similar to the one shown in FIGS. 1A-2C was constructed with optically-calibrated internal supports according to FIG. 3D, with $H_1$ equal to approximately ⅓ of the air gap height for the BLU, and the inclusion of optically-calibrated internal supports did not detectably affect uniformity of illumination. The "stepped" design of FIG. 3D may achieve a large improvement to rigidity of a BLU chassis (e.g., due to increasing the effective area moment of inertia of the chassis, by increasing its cross-sectional width by $$\frac{H_A}{3})$$

without interfering with uniform illumination by the BLU. For other BLU devices that may differ from the exemplary devices shown in the present disclosure, internal supports may provide the increased optical performance based on a configuration of the internal components (e.g., reflectors, LEDs, optical sheets, and/or any other components of a BLU). In some examples, when a BLU includes a stepped/sloped reflector edge as with reflector edge 145E of FIG. 2B, internal supports that mimic the shape of the reflector edge may facilitate large improvements to rigidity while not interfering with uniformity of illumination.

Optically-calibrated internal supports may be constructed by forming rigid material into beams with cross-sections configured to increase diffusion uniformity within a BLU. Preferably, the rigid material is light-weight. Preferably, the rigid material is resistant to deformation and resilient when deformed (e.g., after deformation by an external force, returns to the original flat shape after the external force is reduced). Accordingly, the internal supports and chassis may resist deformation and/or retain a substantially flat shape even as the BLU and display device are subject to external forces (e.g., during user interaction). Non-limiting examples of potentially suitable cross-sections include those shown in FIGS. 3A-3D. Non-limiting examples of material processing techniques for optically-calibrated internal supports include formed sheet metal, extruded metal (e.g., extruded aluminum), and/or fiber-reinforced plastic. Optically-calibrated internal supports may be attached to a BLU chassis in any suitable manner.

Figure 4A:
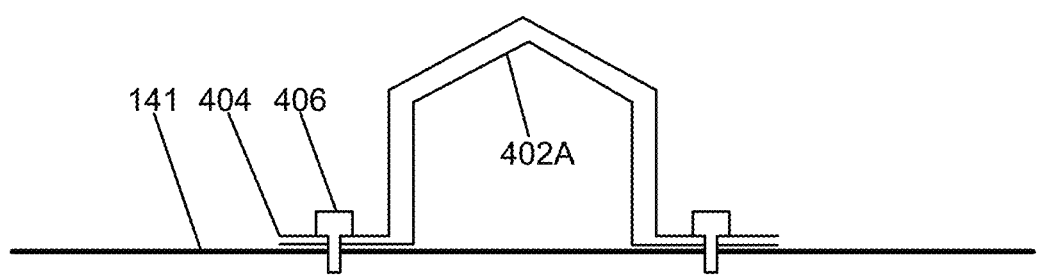
FIGS. 4A-4B show further aspects of exemplary support structures for a BLU.
Figure 4B:
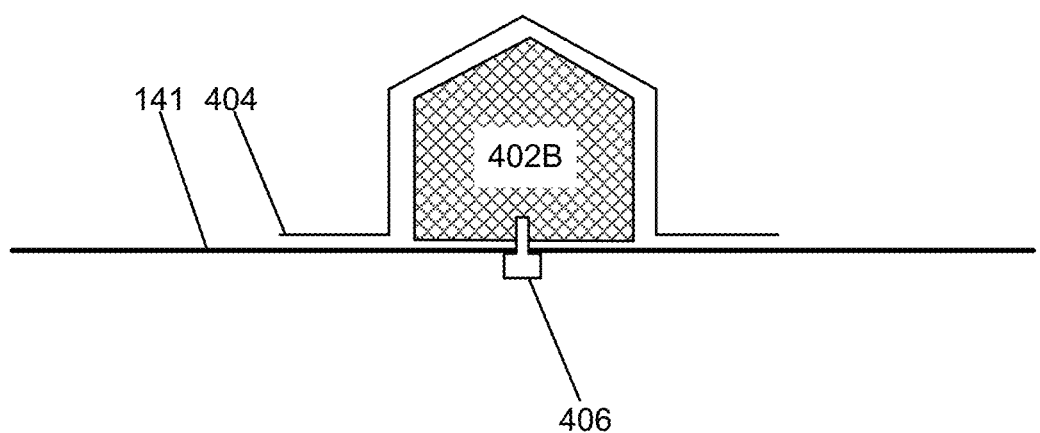

FIGS. 4A and 4B show two non-limiting examples of construction and attachment techniques for optically-calibrated internal supports, in a cross-section view. Both figures show an optically-calibrated internal support attached to a BLU chassis 141. FIG. 4A shows an optically-calibrated internal support formed out of a shaped sheet metal plate 402A and a shaped reflector 404, affixed to BLU chassis 141 with screws 406 at the outer edges of the optically-calibrated internal support 142. Screws 406 may be placed in any suitable arrangement, e.g., at any suitable pitch along the length of the optically-calibrated internal support 142 and BLU chassis 141 (e.g., along the dimension orthogonal to the viewing plane in the cross-section in FIG. 4A). FIG. 4B shows an optically-calibrated internal support 142 formed out of extruded aluminum, affixed to BLU chassis 141 with screws 406 arranged along the length of the optically-calibrated internal support 142 and BLU chassis 141. Shaped reflector 404 is affixed to optically-calibrated internal support 142 and/or BLU chassis 141 with adhesive.

Each reflective surface of optically-calibrated internal supports and/or reflectors in a BLU according to the present disclosure may have a non-uniform variation in reflectivity along its length. In some examples, the optically-calibrated internal support structures may have a non-uniform variation in reflectivity along a length of the internal support structures. In some examples, the reflector may have a non-uniform variation in reflectivity along a length of the reflector, substantially similar to the non-uniform variation in reflectivity along the length of the internal support structures. For example, the reflective surfaces may be calibrated with a specialized surface texture and color to facilitate diffuse, uniform illumination. Specialized surface texture(s) and color(s) may be applied in patterns across reflective surfaces to ensure particular optical properties (e.g., light absorption, diffusivity, etc.). In some examples, the non-uniform variation in reflectivity may include a non-uniform variation in absorption. In some examples, the non-uniform variation in reflectivity includes a non-uniform variation in diffusivity.

Reflective surfaces in the BLU may be textured to enable diffuse reflection of light, e.g., provide diffusively reflected light with equal luminance from a wide range of directions in a volume adjacent to the reflective surface. For example, reflective surfaces may be textured to scatter reflective light, reduce caustics/highlights in light transmitted through optical sheets, reduce specular reflection in the BLU, etc. For example, reflective surfaces may be roughened or have a matte surface. For example, reflective surfaces may be treated to have random and/or regular variation in depth of surface, e.g. stippling. Reflective surface textures with optically desirable properties may be produced using a wide variety of current and/or future techniques, non-limiting examples of which include paint, sand-blasting, chemical etching, and/or coating with plastic sheets, etc.

Figure 5A:
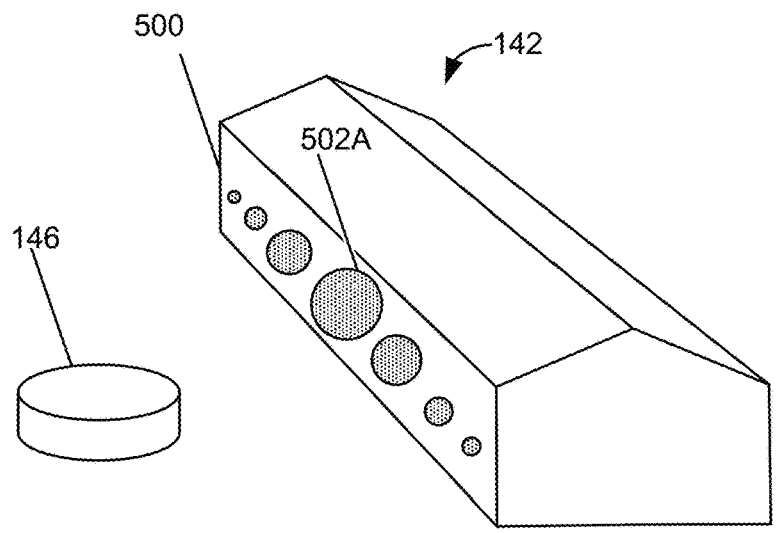
FIG. 5A-5C show exemplary surface color patterns for a support structure for a BLU.
Figure 5B:
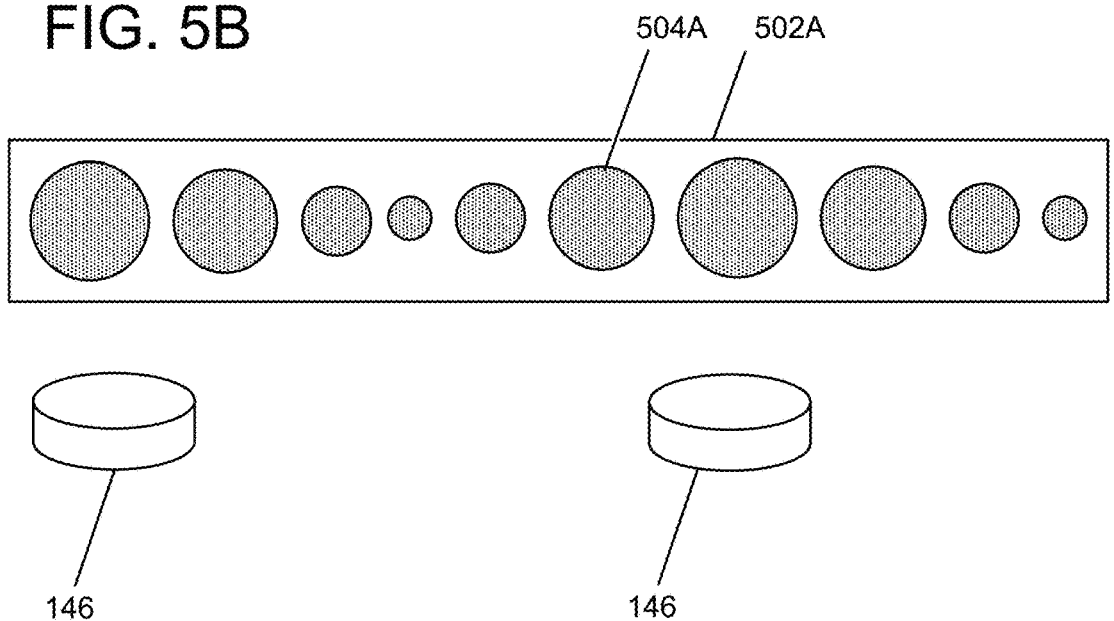
Figure 5C:
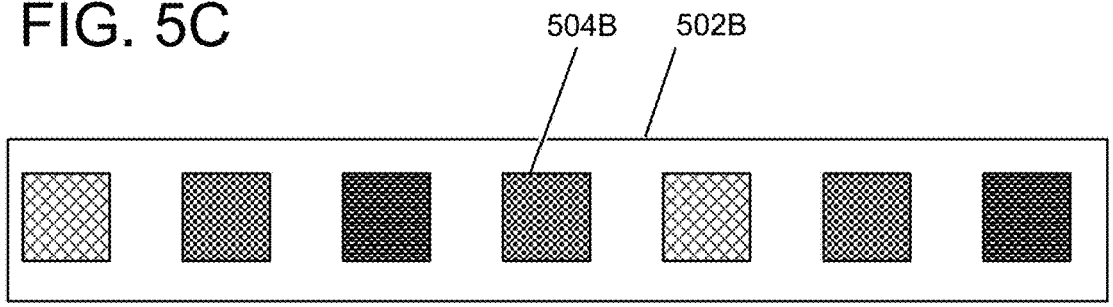

Accordingly, FIG. 5A-5C show non-limiting examples of surface color/texture patterns that may be suitable for optically-calibrated internal supports. For example, the surface pattern 502A shown in FIGS. 5A-5B may facilitate uniform illumination in a BLU chassis with optically-calibrated internal supports, such as the BLU shown in FIGS. 1A-2B. Surface color/texture patterns may be applied to optically-calibrated internal supports using any suitable current and/or future techniques, e.g., paint, pad printing, structural texturing (e.g., holes, etching), printed plastic cover sheets/decals, etc. Accordingly, in some examples, for at least one of the optically-calibrated internal support structures and/or reflectors, a surface of the internal support structure has a plurality of dots, each dot altering reflectivity of the surface and having a size related to the distance from a center of the dot to the one or more light emitters. In some examples, the non-uniform variation in reflectivity corresponds to a distance from points along the length of the length of the internal support structures to the one or more light emitters. For example, the distance to the one or more light emitters may be assessed as a distance to a closest light emitter, an aggregate distance (e.g., sum total, or average distance) to a subset of the closest light emitters (e.g., average distance to the three closest light emitters), and/or aggregate distance to all of the light emitters (e.g., sum distance to all light emitters). In some examples, the relationship of the size of each dot to the distance from the center of the dot to the one or more light emitters includes increasing the size of a dot having a center closer to a closest light emitter of the one or more light emitters. For example, as shown in FIG. 5A, dots having a center closer to a respective closest light emitter of the light emitters may have a larger size relative to dots that are further from a respective closest light emitter.

FIG. 5A shows a perspective view of an LED 146 and a portion of an optically-calibrated internal support 142 in a BLU according to the present disclosure. Optically-calibrated internal support 142 has a surface pattern 502A calibrated to absorb varying amounts of light in darkened regions along the length of the support, with dots having size related to distance to one or more light emitters. The surface pattern 502A may optionally be textured (e.g., with the same or a different texture from other surfaces of optically-calibrated internal support 142).

Although FIG. 5A shows a surface pattern 502A on an optically-calibrated internal support 142, the surface pattern 502A shown in FIGS. 5A-5B may be applied to other vertical surfaces 500 near LEDs in a BLU to facilitate uniform illumination, e.g., analogous vertical surfaces of reflectors at the BLU edge such as the vertical surfaces of optically-calibrated internal support 142 and reflector edge 145E of FIG. 2B.

FIG. 5B is a schematic view of surface pattern 502A showing how the pattern varies based on proximity to LEDs in an exemplary BLU. As shown in FIG. 5B, the surface pattern 502A is patterned with a gradient of differently sized dots 504A that substantially absorb (rather than reflect) light with varying area. FIG. 5B shows two exemplary LEDs 146. The dots 504A are larger nearer to LEDs and smaller along a gradient with a smallest dot corresponding to a midpoint between LEDs.

FIGS. 5A-5B show one non-limiting exemplary surface pattern with a gradient of differently sized dots. Other surface patterns may be used to vary optical properties (e.g., absorbance and/or diffusivity) along a length of reflective surfaces in a BLU according to the present disclosure, e.g., in order to optically-calibrate internal supports to facilitate uniform illumination from the BLU. For example, FIG. 5C shows a further non-limiting example of a surface pattern 502C that may facilitate uniform illumination in a BLU. Surface pattern 502C has patterned squares with cross-hatched squares 504B with varying density of cross-hatching. Surface pattern 502C may absorb more light in the dense (e.g., darker) cross-hatched squares. Surface pattern 502C may be placed with darkened squares closer to LEDs, analogous to the placement of the surface pattern 502A of FIGS. 5A-5B.

In an example, a backlight unit for a display device comprises: a chassis; a reflector affixed to the chassis; optical sheets affixed to the chassis, wherein there is an air gap between the reflector and the optical sheets; one or more light emitters affixed to the chassis; and optically-calibrated internal support structures disposed within the air gap and affixed to the chassis, wherein the optically-calibrated internal support structures are configured to increase rigidity of the chassis, and to substantially not alter the uniformity of light emitted by the one or more light emitters through the optical sheets. In this or any other example, the reflector includes an optically-calibrated edge geometry, and the optically-calibrated internal support structures have an optically-calibrated edge geometry conforming to the optically-calibrated edge geometry of the reflector. In this or any other example, the edge geometry of the reflector and the optically-calibrated internal support structures have a cross-sectional shape including a substantially vertical section attached to the chassis and extending substantially perpendicular to a plane of the chassis, and a sloped section extending from the vertical section; and the vertical section and the sloped section comprise a first portion of a symmetric shape having two mirror-symmetric portions. In this or any other example, at least one of the optically-calibrated internal support structures has a non-uniform variation in reflectivity along its length. In this or any other example, for at least one of the optically-calibrated internal support structures, a surface of the internal support structure has a plurality of dots, each dot altering reflectivity of the surface and having a size related to the distance from a center of the dot to the one or more light emitters. In this or any other example, an edge geometry of the optically-calibrated internal support structures has a cross sectional shape including a sloped section extending from a plane of the chassis at an angle between 25 and 40 degrees. In this or any other example, an edge geometry of the optically-calibrated internal support structures has a cross sectional shape including a horizontal section substantially parallel to the chassis, and a vertical section extending from the horizontal section and substantially perpendicular to the horizontal section and chassis.

In an example, a display device comprises: a display screen; and a backlight unit configured to illuminate the display screen, the backlight unit including: a chassis; a reflector affixed to the chassis, the reflector including an optically-calibrated edge geometry; one or more light emitters affixed to the chassis; optical sheets affixed to the chassis, wherein there is an air gap between the reflector and the optical sheets; and optically-calibrated internal support structures disposed within the air gap and affixed to the chassis, wherein the optically-calibrated internal support structures have an optically-calibrated edge geometry conforming to the optically-calibrated edge geometry of the reflector. In this or any other example, the edge geometry of the reflector and the optically-calibrated internal support structures have a cross-sectional shape including a vertical section attached to the chassis and extending substantially perpendicular to a plane of the chassis, and a sloped section extending from the vertical section. In this or any other example, the sloped section extends at an angle of between 10 and 60 degrees relative to the plane of the chassis. In this or any other example, the vertical section and the sloped section comprise a first portion of a symmetric shape having two mirror-symmetric portions. In this or any other example, the edge geometry of the optically-calibrated internal support structures extends from a plane of the chassis to a cross-sectional height of between one eighth and one half of a height of the air gap between the reflector and the optical sheets. In this or any other example, at least one of the optically-calibrated internal support structures has a non-uniform variation in reflectivity along its length.

In an example, a backlight unit for a display device comprises: a chassis; a reflector affixed to the chassis; one or more light emitters affixed to the chassis; optical sheets affixed to the chassis, wherein there is an air gap between the reflector and the optical sheets; and optically-calibrated internal support structures disposed within the air gap and affixed to the chassis, wherein the optically-calibrated internal support structures have a non-uniform variation in reflectivity along a length of the internal support structures. In this or any other example, the reflector has a non-uniform variation in reflectivity along a length of the reflector, substantially similar to the non-uniform variation in reflectivity along the length of the internal support structures. In this or any other example, the non-uniform variation in reflectivity corresponds to a distance from points along the length of the length of the internal support structures to the one or more light emitters. In this or any other example, a surface of the internal support structures has a plurality of dots, each dot altering reflectivity of the surface and having a size related to the distance from a center of the dot to the one or more light emitters. In this or any other example, the relationship of the size of each dot to the distance from the center of the dot to the one or more light emitters includes increasing the size of a dot having a center closer to a closest light emitter of the one or more light emitters. In this or any other example, the non-uniform variation in reflectivity includes a non-uniform variation in absorption. In this or any other example, the non-uniform variation in reflectivity includes a non-uniform variation in diffusivity.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A backlight unit for a display device, comprising:
a chassis;
a reflector affixed to the chassis;
optical sheets affixed to the chassis, wherein there is an air gap between the reflector and the optical sheets;
one or more light emitters affixed to the chassis; and
optically-calibrated internal support structures disposed within the air gap and affixed to the chassis, wherein the optically-calibrated internal support structures are configured to increase rigidity of the chassis, to substantially not alter the uniformity of light emitted by the one or more light emitters through the optical sheets, and wherein at least one of the optically-calibrated internal support structures has a non-uniform variation in reflectivity along its length.

2. The backlight unit of claim 1, wherein the reflector includes an optically-calibrated edge geometry, and the optically-calibrated internal support structures have an optically-calibrated edge geometry conforming to the optically-calibrated edge geometry of the reflector.

3. The backlight unit of claim 2, wherein:
the edge geometry of the reflector and the optically-calibrated internal support structures have a cross-sectional shape including a substantially vertical section attached to the chassis and extending substantially perpendicular to a plane of the chassis, the substantially vertical section of the optically-calibrated internal support structures disposed directly above and extending away from an upper surface of the reflector, and a sloped section extending from the vertical section; and
the vertical section and the sloped section comprise a first portion of a symmetric shape having two mirror-symmetric portions.

4. The backlight unit of claim 1, wherein for at least one of the optically-calibrated internal support structures, a surface of the internal support structure has a plurality of dots, each dot altering reflectivity of the surface and having a size related to the distance from a center of the dot to the one or more light emitters.

5. The backlight unit of claim 1, wherein an edge geometry of the optically-calibrated internal support structures has a cross sectional shape including a sloped section extending from a plane of the chassis at an angle between 25 and 40 degrees.

6. The backlight unit of claim 1, wherein an edge geometry of the optically-calibrated internal support structures has a cross sectional shape including a horizontal section substantially parallel to the chassis, and a vertical section extending from the horizontal section and substantially perpendicular to the horizontal section and chassis.

7. A display device, comprising:
a display screen; and
a backlight unit configured to illuminate the display screen, the backlight unit including:
a chassis;
a reflector affixed to the chassis, the reflector including an optically-calibrated edge geometry;
one or more light emitters affixed to the chassis;
optical sheets affixed to the chassis, wherein there is an air gap between the reflector and the optical sheets; and
optically-calibrated internal support structures disposed within the air gap and affixed to the chassis, wherein the optically-calibrated internal support structures have an optically-calibrated edge geometry conforming to the optically-calibrated edge geometry of the reflector, and wherein at least one of the optically-calibrated internal support structures has a non-uniform variation in reflectivity along its length.

8. The display device of claim 7, wherein the edge geometry of the reflector and the optically-calibrated internal support structures have a cross-sectional shape including a vertical section attached to the chassis and extending substantially perpendicular to a plane of the chassis, and a sloped section extending from the vertical section.

9. The display device of claim 8, wherein the sloped section extends at an angle of between 10 and 60 degrees relative to the plane of the chassis.

10. The display device of claim 8, wherein the vertical section and the sloped section comprise a first portion of a symmetric shape having two mirror-symmetric portions.

11. The display device of claim 7, wherein the edge geometry of the optically-calibrated internal support structures extends from a plane of the chassis to a cross-sectional height of between one eighth and one half of a height of the air gap between the reflector and the optical sheets.

12. A backlight unit for a display device, comprising:
a chassis;
a reflector affixed to the chassis;
one or more light emitters affixed to the chassis;
optical sheets affixed to the chassis, wherein there is an air gap between the reflector and the optical sheets; and
optically-calibrated internal support structures disposed within the air gap and affixed to the chassis, wherein the optically-calibrated internal support structures have a non-uniform variation in reflectivity along a length of the internal support structures, and wherein the optically-calibrated internal support structures have a height that is less than a height of the air gap between the reflector and the optical sheets.

13. The backlight unit of claim 12, wherein the reflector has a non-uniform variation in reflectivity along a length of the reflector, substantially similar to the non-uniform variation in reflectivity along the length of the internal support structures.

14. The backlight unit of claim 12, wherein the non-uniform variation in reflectivity corresponds to a distance from points along the length of the length of the internal support structures to the one or more light emitters.

15. The backlight unit of claim 12, wherein a surface of the internal support structures has a plurality of dots, each dot altering reflectivity of the surface and having a size related to the distance from a center of the dot to the one or more light emitters.

16. The backlight unit of claim 15, wherein the relationship of the size of each dot to the distance from the center of the dot to the one or more light emitters includes increasing the size of a dot having a center closer to a closest light emitter of the one or more light emitters.

17. The backlight unit of claim 12, wherein the non-uniform variation in reflectivity includes a non-uniform variation in absorption.

18. The backlight unit of claim 12, wherein the non-uniform variation in reflectivity includes a non-uniform variation in diffusivity.

* * * * *